Dec. 9, 1924.

J. HARRIS

INDUCTION ELECTRICITY METER

Original Filed July 2, 1923   2 Sheets-Sheet 1

1,518,196

Inventor:
Jesse Harris.
By L. N. Bragg Atty.

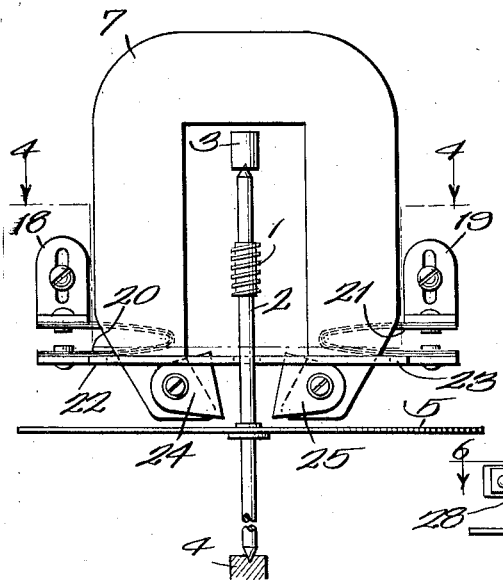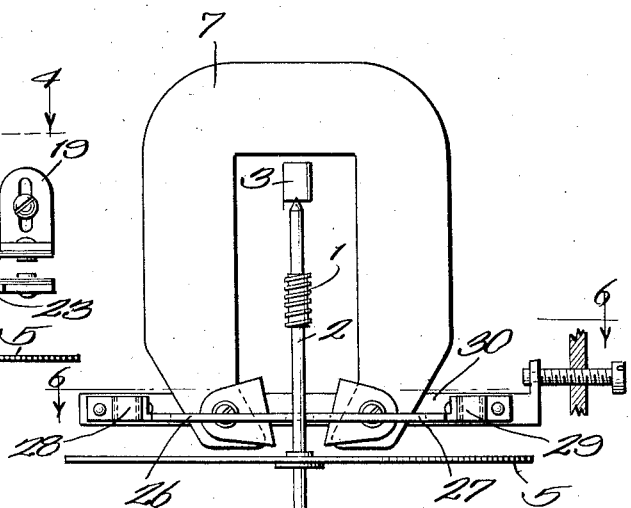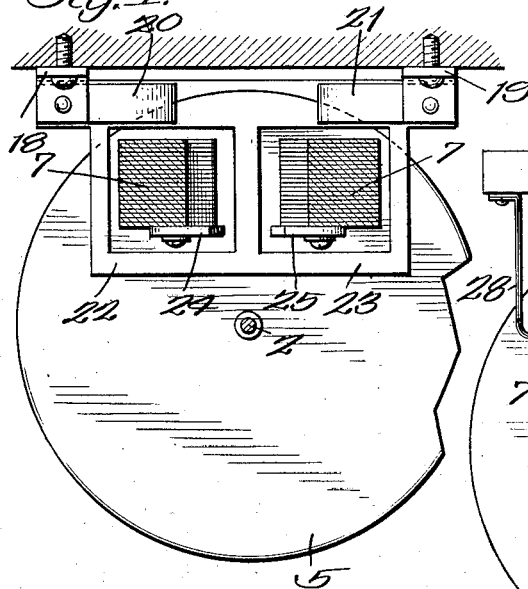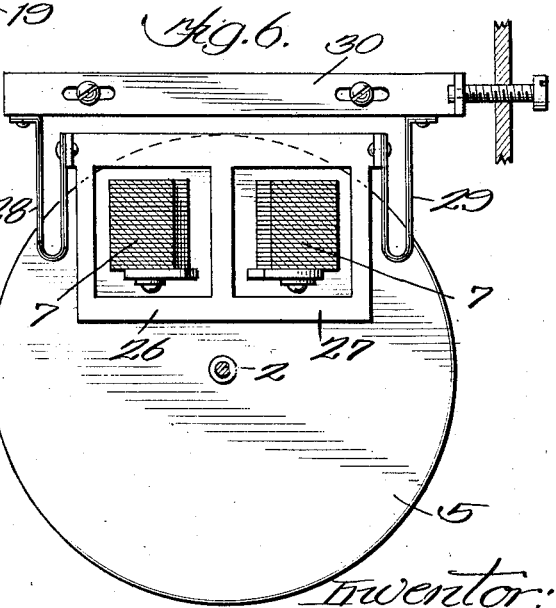

Patented Dec. 9, 1924.

1,518,196

UNITED STATES PATENT OFFICE.

JESSE HARRIS, OF LA FAYETTE, INDIANA, ASSIGNOR TO DUNCAN ELECTRIC MANUFACTURING COMPANY, OF LA FAYETTE, INDIANA, A CORPORATION OF ILLINOIS.

INDUCTION ELECTRICITY METER.

Application filed July 2, 1923, Serial No. 649,068. Renewed April 28, 1924.

*To all whom it may concern:*

Be it known that I, JESSE HARRIS, citizen of the United States, residing at La Fayette, in the county of Tippecanoe and State of Indiana, have invented a certain new and useful Improvement in Induction Electricity Meters, of which the following is a full, clear, concise, and exact description.

My invention relates to electricity meters and is particularly applicable to induction watthour meters, though the invention is not to be thus restricted.

Induction watthour meters as ordinarily constructed are open to errors due to changes in temperature, particularly when integrating energy on low power factor circuits. This is due in part to the temperature coefficient of metal used in the construction of such a meter and the losses which result from changes in temperature. As is well known, in order to obtain accuracy on inductive loads, the flux of the potential coil must lag just 90 degrees behind the flux of the series coil on a unity power factor circuit.

In watthour meters as at present constructed, correction is sought by introducing into the flux path of the potential element a secondary coil of the proper magnitude to compensate for the effect of the losses in the potential element. The flux due to this secondary coil has sufficiently more than 90 degrees phase displacement. This combined with the flux due to the potential winding, which is displaced less than 90 degrees in phase, produces a resultant that has the effect of the desired quadrature relation.

Unfortunately the condition of balance in the various circuits are only possible at one definite temperature owing to changes in electrical resistance that are due to changes in temperature and arise because of the temperature coefficient of metal in the meter. In accordance with my invention, I employ a device, responsive to changes in temperature, in controlling relation to the phase displacement of the current and pressure fields and serving to maintain such displacement upon change in temperature.

In practicing my invention in the preferred way, a thermostatic or thermo-motive element modifies the action of the secondary, preferably by shifting the position thereof, to compensate for temperature changes. A similar device is also preferably employed to control the effect of the friction compensating secondary coil that is usually employed in induction watthour meters.

Figure 1:
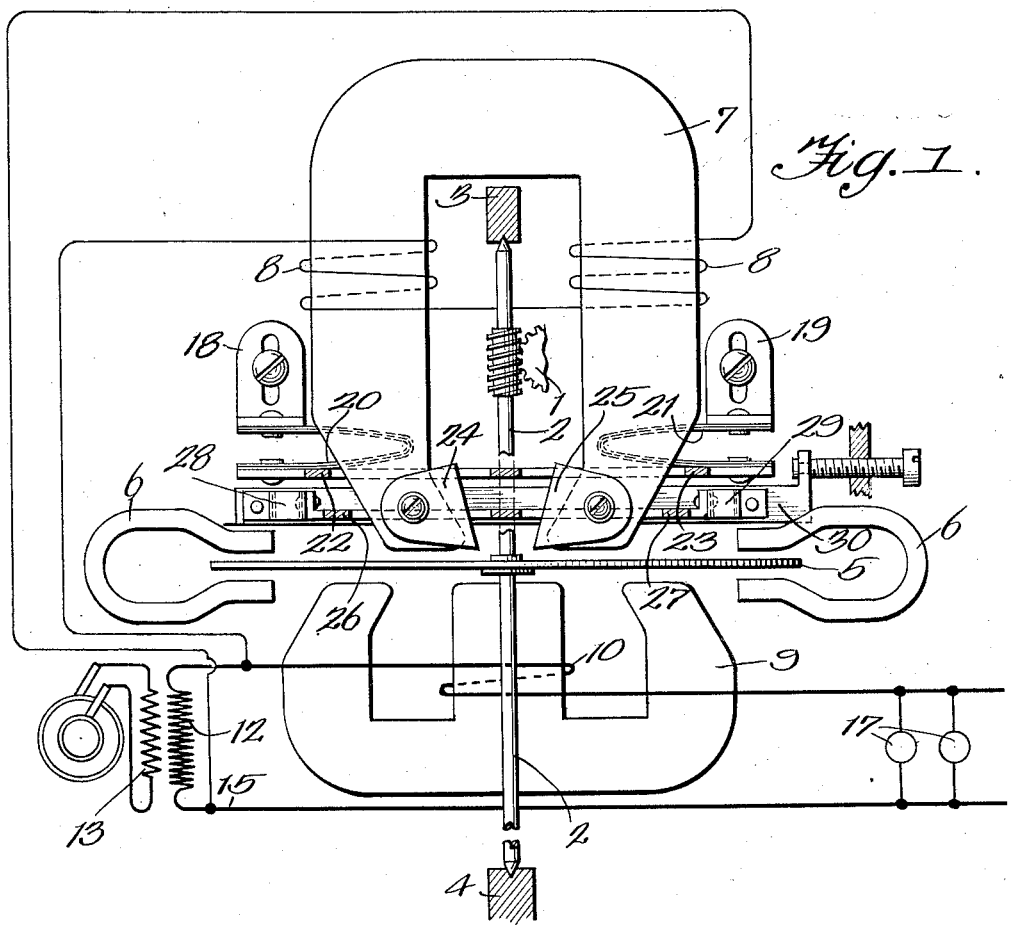
Figure 2:
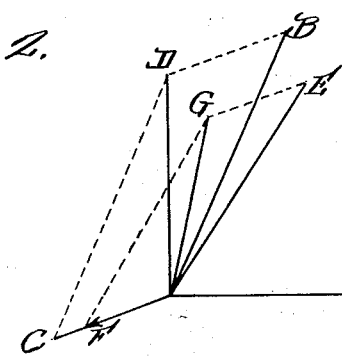

The invention will be more fully explained in connection with the accompanying drawings illustrating the preferred embodiment thereof and in which Fig. 1 is a diagrammatic illustration of my improved meter and an alternating current system of distribution with which it is connected; Fig. 2 is a vector diagram; Fig. 3 is an elevation of the potential element of the meter with my device for regulating the potential flux to secure desired phase regulation; Fig. 4 is a sectional view on line 4—4 of Fig. 3; Fig. 5 is an elevation of the potential element of the meter with my device for regulating the secondary friction compensating coil; and Fig. 6 is a sectional view on line 6—6 of Fig. 5.

Like parts are indicated by similar characters of reference throughout the different figures.

The meter illustrated includes any suitable integrating or revolution counting mechanism 1 which is operated by the upright meter shaft or spindle 2 suitably supported at its ends in bearings 3, 4. Said spindle carries a closed conductor in the form of a disc 5, preferably made of aluminum. This disc may serve as an armature to constitute a part of the motive element of the meter and also preferably serves as an element of a damping device which turns in a magnetic field furnished by one or more damping permanent magnets 6, in accordance with common practice. The armature 5 is preferably also the armature of the motor member of the meter, being subject to potential magnetic flux passing therethrough from the poles of the U-shaped magnet core 7 that is perpendicular to and on one side of the armature disc 5 and is provided with the shunt or potential winding 8. An E-shaped core 9 is perpendicular to and upon the other side of the armature disc. The middle leg of core 9 is wound with a current winding 10 included in a main of the system and co-operating with the meter armature and the potential element to produce torque proportional to the wattage. The source of current, in the embodiment of the invention illustrated, is the secondary 12 of a transformer whose primary 13 is suitably connected with a generating station. The pressure winding 8 is connected in parallel with the source 12. The mains 14, 15 extend from the secondary terminals and constitute sides of a working or load circuit. Translating devices 17, such as incandescent lamps, are connected in bridge between the mains.

The vector diagram of Fig. 2 illustrates conditions due to two different degrees of temperature as they hitherto obtained. In this diagram A equals initial E. M. F., B equals flux due to the shunt coil primary winding, C equals flux due to secondary winding, and D equals resultant flux (as adjusted at some definite temperature).

If the temperature is raised to cause increased resistance of the primary winding or shunt coil, the vector B is caused to change position until it occupies position E, at the same time, because the vector C is now shortened until it is represented by F. The resultant of these two vectors represented by G is not only out of quadrature relation with A, but also less in magnitude, causing a large error to be introduced into the readings of the meter.

Adjusting brackets 18, 19 have thermostatic or thermo-motive elements 20, 21 anchored thereto each at one end, these elements desirably each comprising two strips of metal of different coefficients of expansion. Secondary coils 22 and 23, preferably integrally formed by punching holes in a single piece of sheet metal, are attached to the other ends of the thermostatic elements, each of these holes receiving a pole of the shunt or potential core. The secondaries 22 and 23 are mounted adjacent the armature to be movable along the axes of the limbs of the potential core. The positions on the potential core of these secondary coils determine their activity. After being adjusted in proper position for a given temperature, by means of the brackets 18 and 19, the secondary coils will function at that temperature. Upon increase in temperature the primary winding on the potential core and the secondaries 22, 23 increase in resistance which hitherto would disturb the phasing adjustment. However, the thermostatic elements 20, 21 in the device of my invention expand upon increase in temperature and cause the secondaries 22 23 to take up a more active position and being properly proportioned, exactly compensate for the change in phase angle, and maintain the quadrature relation between the flux and electromotive force.

The flat pieces of iron 24, 25, pivotally mounted upon the poles of the shunt core, form adjustable pole pieces for such core. They provide a means whereby the flux cut by the secondary coils 22, 23 is made of such degree for each unit of adjustment of said secondary coils 22, 23 that, under the action of the thermostatic elements 20, 21, the activity of such secondaries will be such as to annul the errors caused by the heating of the windings. The effect of the secondary coils 22, 23 is dependent upon the amount of flux which threads them, and the density of the flux is controlled by the reluctance of the gap between the poles of the shunt core. The relative density of flux in every part of the gap between the poles of the shunt core can be controlled by the adjustable pole pieces 24, 25 of such core. Under the action of the thermostatic elements 20, 21 the coils 22, 23 are moved a definite distance for each unit change of temperature, this movement being (in the type of meter shown), parallel with the axes of the sides of the potential core. The adjustable pole pieces control the density of flux in each part of the gap and thus for each change in position of the coils 22, 23 a definite change in flux cut can be anticipated, and the meter calibrated to compensate for all changes in temperature correctly.

The results consequent upon increase of temperature have been set forth. The converse is true if the temperature be decreased.

I also compensate for the effect of variable resistance in the friction compensating secondary coils 26, 27 due to changes in temperature. These coils, which are located adjacent the armature, are adjusted (in the type of meter shown) transversely of the axes of the sides of the potential core. The thermostatic elements 28, 29 couple the coils 26, 27 with their manually adjustable mountings 30. These thermostatic elements serve to move the coils 26, 27 into a more or less active position upon an increase or decrease in temperature respectively. Obviously the metal member having the greater coefficient of expansion is upon the outside of one thermostatic element 28 or 29 and upon the inside of the other.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:—

1. An induction electricity meter including an armature; a magnet system with which said armature is in inductive relation and comprising one magnet having a magnetic core supplied with a current winding and another magnet having a magnetic core supplied with a pressure winding; a conductor in secondary relation to the pressure winding; and a device, responsive to change in temperature, for changing the inductive relation of said pressure winding and secondary conductor.

2. An induction electricity meter including an armature; a magnet system with which said armature is in inductive relation and comprising one magnet having a magnetic core supplied with a current winding and another magnet having a magnetic core supplied with a pressure winding; a conductor in secondary relation to the pressure winding; and a thermo-motive element in actuating relation to said secondary conductor for changing the inductive relation of said pressure winding and secondary conductor.

3. An induction electricity meter including an armature; a magnet system with which said armature is in inductive relation and comprising one magnet having a magnetic core supplied with a current winding and another magnet having a magnetic core supplied with a pressure winding; a conductor in secondary relation to the pressure winding and mounted to be movable along the axis of the pressure winding; and a thermo-motive element in actuating relation to said secondary conductor for changing the inductive relation of said pressure winding and secondary conductor.

4. An induction electricity meter including an armature; a magnet system with which said armature is in inductive relation and comprising one magnet having a magnetic core supplied with a current winding and another magnet having a magnetic core supplied with a pressure winding; a conductor in secondary relation to the pressure winding and mounted to be movable transversely of the axis of the pressure winding; and a thermo-motive element in actuating relation to said secondary conductor for changing the inductive relation of said pressure winding and secondary conductor.

5. An induction electricity meter including an armature; a magnet system with which said armature is in inductive relation and including a current winding and a pressure winding; a conductor in secondary relation to the pressure winding; and a device, responsive to change in temperature, for changing the inductive relation of said pressure winding and secondary conductor.

6. An induction electricity meter including an armature; a magnet system with which said armature is in inductive relation and including a current winding and a pressure winding; a conductor in secondary relation to the pressure winding; and a thermo-motive element in actuating relation to said secondary conductor for changing the inductive relation of said pressure winding and secondary conductor.

7. An induction electricity meter including an armature; a magnet system with which said armature is in inductive relation and including a current winding and a pressure winding; a conductor in secondary relation to the pressure winding and mounted to be movable along the axis of the pressure winding; and a thermo-motive element in actuating relation to said secondary conductor for changing the inductive relation of said winding and secondary conductor.

8. An induction electricity meter including an armature; a magnet system with which said armature is in inductive relation and including a current winding and a pressure winding; a conductor in secondary relation to the pressure winding and mounted to be movable transversely of the axis of the pressure winding; and a thermo-motive element in actuating relation to said secondary conductor for changing the inductive relation of said pressure winding and secondary conductor.

9. An induction electricity meter including an armature; a magnet system with which said armature is in inductive relation and comprising one magnet having a magnetic core supplied with a current winding and another magnet having a magnetic core supplied with a pressure winding; a conductor adjacent the armature and in secondary relation to the pressure winding; and a device, responsive to change in temperature, for changing the inductive relation of said pressure winding and secondary conductor.

10. An induction electricity meter including an armature; a magnet system with which said armature is in inductive relation and comprising one magnet having a magnetic core supplied with a current winding and another magnet having a magnetic core supplied with a pressure winding; a conductor adjacent the armature and in secondary relation to the pressure winding; and a thermo-motive element in actuating relation to said secondary conductor for changing the inductive relation of said pressure winding and secondary conductor.

11. An induction electricity meter including an armature; a magnet system with which said armature is in inductive relation and comprising one magnet having a magnetic core supplied with a current winding and another magnet having a magnetic core supplied with a pressure winding; a conductor adjacent the armature and in secondary relation to the pressure winding and mounted to be movable along the axis of the pressure winding; and a thermo-motive element in actuating relation to said secondary conductor for changing the inductive relation of said pressure winding and secondary conductor.

12. An induction electricity meter including an armature; a magnet system with which said armature is in inductive relation and comprising one magnet having a magnetic core supplied with a pressure winding; a conductor adjacent the armature and in secondary relation to the pressure winding and mounted to be movable transversely of the axis of the pressure winding; and a thermo-motive element in actuating relation to said secondary conductor for changing the inductive relation of said pressure winding and secondary conductor.

13. An induction electricity meter including an armature; a magnet system with which said armature is in inductive relation and including a current winding and a pressure winding; a conductor adjacent the armature and in secondary relation to the pressure winding; and a device, responsive to change in temperature, for changing the inductive relation of said pressure winding and secondary conductor.

14. An induction electricity meter including an armature; a magnet system with which said armature is in inductive relation and including a current winding and a pressure winding; a conductor adjacent the armature and in secondary relation to the pressure winding; and a thermo-motive element in actuating relation to said secondary conductor for changing the inductive relation of said pressure winding and secondary conductor.

15. An induction electricity meter including an armature; a magnet system with which said armature is in inductive relation and including a current winding and a pressure winding; a conductor adjacent the armature and in secondary relation to the pressure winding and mounted to be movable along the axis of the pressure winding; and a thermo-motive element in actuating relation to said secondary conductor for changing the inductive relation of said winding and secondary conductor.

16. An induction electricity meter including an armature; a magnet system with which said armature is in inductive relation and including a current winding and a pressure winding; a conductor adjacent the armature and in secondary relation to the pressure winding and mounted to be movable transversely of the axis of the pressure winding; and a thermo-motive element in actuating relation to said secondary conductor for changing the inductive relation of said pressure winding and secondary conductor.

17. An induction electricity meter including an armature; current and pressure windings in inductive relation to the armature; and a device responsive to changes in temperature in controlling relation to the phase displacement of the current and pressure fields and serving to maintain such displacement upon change in temperature.

18. An induction electricity meter including an armature; current and pressure windings in inductive relation to the armature; and a thermo-motive device, responsive to changes in temperature in controlling relation to the phase displacement of the current and pressure fields and serving to maintain such displacement upon change in temperature.

In witness whereof, I hereunto subscribe my name this 15th day of June A. D., 1923.

JESSE HARRIS.